(12) United States Patent
Hurtado

(10) Patent No.: US 11,189,976 B2
(45) Date of Patent: *Nov. 30, 2021

(54) ELECTRICAL SYSTEM FOR DOCKSIDE POWER PEDESTALS

(71) Applicant: SMARTPLUG SYSTEMS LLC, Seattle, WA (US)

(72) Inventor: Teofilo W. Hurtado, Seattle, WA (US)

(73) Assignee: Smartplay Systems LLC, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/025,066

(22) Filed: Sep. 18, 2020

(65) Prior Publication Data

US 2021/0098954 A1 Apr. 1, 2021

Related U.S. Application Data

(63) Continuation of application No. 16/586,471, filed on Sep. 27, 2019, now Pat. No. 10,886,679.

(51) Int. Cl.
| | |
|---|---|
| *H01R 24/76* | (2011.01) |
| *H01R 13/52* | (2006.01) |
| *H01R 13/627* | (2006.01) |
| *H01R 13/639* | (2006.01) |
| *H01R 31/06* | (2006.01) |
| *H01R 13/73* | (2006.01) |
| *H02G 3/04* | (2006.01) |
| *H01R 105/00* | (2006.01) |

(52) U.S. Cl.
CPC ......... *H01R 24/76* (2013.01); *H01R 13/5202* (2013.01); *H01R 13/5213* (2013.01); *H01R 13/5219* (2013.01); *H01R 13/6272* (2013.01); *H01R 13/6395* (2013.01); *H01R 13/73* (2013.01); *H01R 31/06* (2013.01); *H01R 2105/00* (2013.01); *H02G 3/0493* (2013.01)

(58) Field of Classification Search
CPC ...... H05K 5/03; H01R 24/76; H01R 13/5202; H01R 13/5213; H01R 13/5219; H01R 13/6272; H01R 13/6395; H01R 13/73; H01R 13/06

See application file for complete search history.

(56) References Cited

U.S. PATENT DOCUMENTS

| | | | | |
|---|---|---|---|---|
| 4,883,924 A * | 11/1989 | Hadfield | ................ | H02G 3/185 174/482 |
| 7,082,729 B2 * | 8/2006 | Cole | ...................... | H02G 3/185 52/220.8 |

(Continued)

*Primary Examiner* — Abdullah A Riyami
*Assistant Examiner* — Nader J Alhawamdeh
(74) *Attorney, Agent, or Firm* — Clark A. Puntigam; Jensen & Puntigam P.S.

(57) ABSTRACT

A receptacle assembly includes one or more receptacle housing members, each having an inner portion which extends outwardly beyond the housing member defining an asymmetrical opening therebetween to secure a male connector. The inner portion includes openings to secure electrical prong members from the male connector. Electrical connectors extend from the inner portion to electrical power lines from a dockside power pedestal or post. A mounting assembly portion of the retrofit receptacle assembly secures the receptacle to the dockside power pedestal or post.

3 Claims, 17 Drawing Sheets

(56) References Cited

U.S. PATENT DOCUMENTS

| | | | | |
|---|---|---|---|---|
| 7,306,482 B1* | 12/2007 | Kidman | ............... | H01R 13/73 |
| | | | | 439/538 |
| 7,554,034 B2* | 6/2009 | Smith | ............... | H01R 13/5213 |
| | | | | 174/135 |
| 8,827,731 B2* | 9/2014 | Sasaki | ............... | B60L 53/18 |
| | | | | 439/206 |
| 9,150,172 B2* | 10/2015 | Matsuda | ............... | B60L 53/18 |
| 9,819,116 B1* | 11/2017 | Baughman | ............ | B62D 25/24 |
| 2014/0370732 A1* | 12/2014 | Curtis | ............... | H01R 24/28 |
| | | | | 439/142 |

* cited by examiner

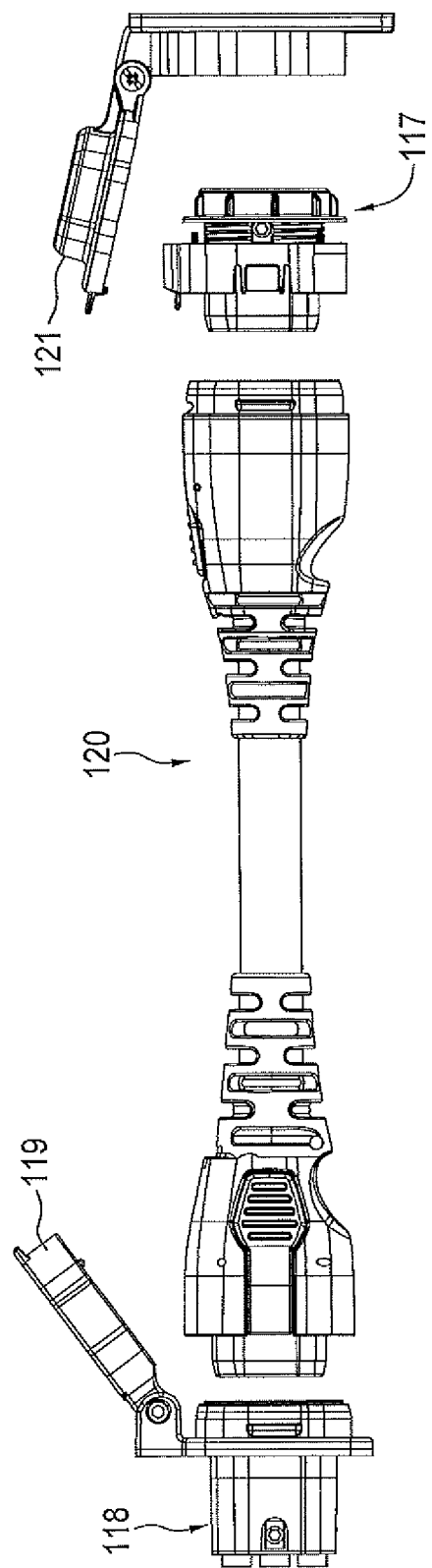

ELECTRICAL SYSTEM FOR DOCKSIDE POWER PEDESTALS

PREVIOUS PATENT APPLICATION

This application is a continuation of pending patent application Ser. No. 16/586,471, filed on Sep. 27, 2019.

TECHNICAL FIELD

This invention relates generally to electrical connector assemblies used in dockside electrical power pedestals, and more particularly concerns an electrical assembly for such power pedestals.

BACKGROUND OF THE INVENTION

Electrical power units, frequently referred to as power pedestals, are provided at dockside installations, such as along piers, for boats and other marine vessels. Electrical connections are provided between the power pedestal, which is connected to a land-based power supply, and the pedestal. Such power pedestals are well known, with various configurations, and typically have electrical connections for both 30 amp and 50 amp power. Boats and other marine vessels can thus obtain power from a dockside source for their boats rather than use their own battery power.

Present power pedestals, however, have several disadvantages. They are open to the weather, even those units which have a lid or the like to cover the actual electrical receptacles/connections or sockets. Weather typically produces corrosion in the receptacle, even with a lid removably covering the receptacles, interfering with performance and presenting a significant fire hazard. Fires cause damage to the pedestal as well as possibly the dock. It is a significant issue for marine facilities using power pedestals with a land based power supply.

Accordingly, the present invention is directed toward producing a receptacle arrangement for existing power pedestals which is protective against the weather and the fire hazard of existing power pedestals as well as being easy and convenient to use.

SUMMARY OF THE INVENTION

Accordingly, the power receptacle assembly for use on a dockside post, comprises: a power receptacle assembly configured to be securable to a dockside post, the power receptacle assembly including a power receptacle having an outer housing member and an inner portion which extends from the housing member forwardly beyond a forward edge of the outer housing member, arranged to define an opening between the outer housing member and the inner portion, the inner portion having a forward surface with female openings to receive therethrough male electrical prongs from a separate male connector assembly connecting to electrical connections positioned within the inner portion, wherein the male connector is inserted into the power receptacle, thereby providing electrical connection between the power receptacle and the male connector assembly, wherein a forward portion of the male connector assembly fits within the opening between the outer housing member and the inner portion, wherein the male connector assembly is connectable to a power supply on a boat present at dockside; wherein the electrical connections positioned within the inner portion of the power receptacle receive electrical power from a power source present on the dockside post, wherein the power receptacle assembly includes a mounting member to which the power receptacle is secured, wherein the power receptacle assembly is securable to the dockside post, such that electrical power from the power source on the dockside post is provided to the power receptacle in the power receptacle assembly; and a weather resistant cover assembly for the power receptacle, including a cover member pivotally connected to the power receptacle, wherein the cover member in a closed position covers a front portion of the power receptacle for weather resistance when the male connector assembly is not inserted into the power receptacle, the cover member having a tab at a lower end thereof for locking the cover member in its closed position to the power receptacle, and wherein the cover member in an open position is latchable to a mating portion of an inserted male connector assembly, thereby providing securement between the power receptacle and the inserted male connector assembly.

BRIEF DESCRIPTION OF THE DRAWINGS

FIG. 7 is a elevational view of a complete electrical matching assembly between the dockside receptacle and a boat connection.

BEST MODE FOR CARRYING OUT THE INVENTION

Figure 1:
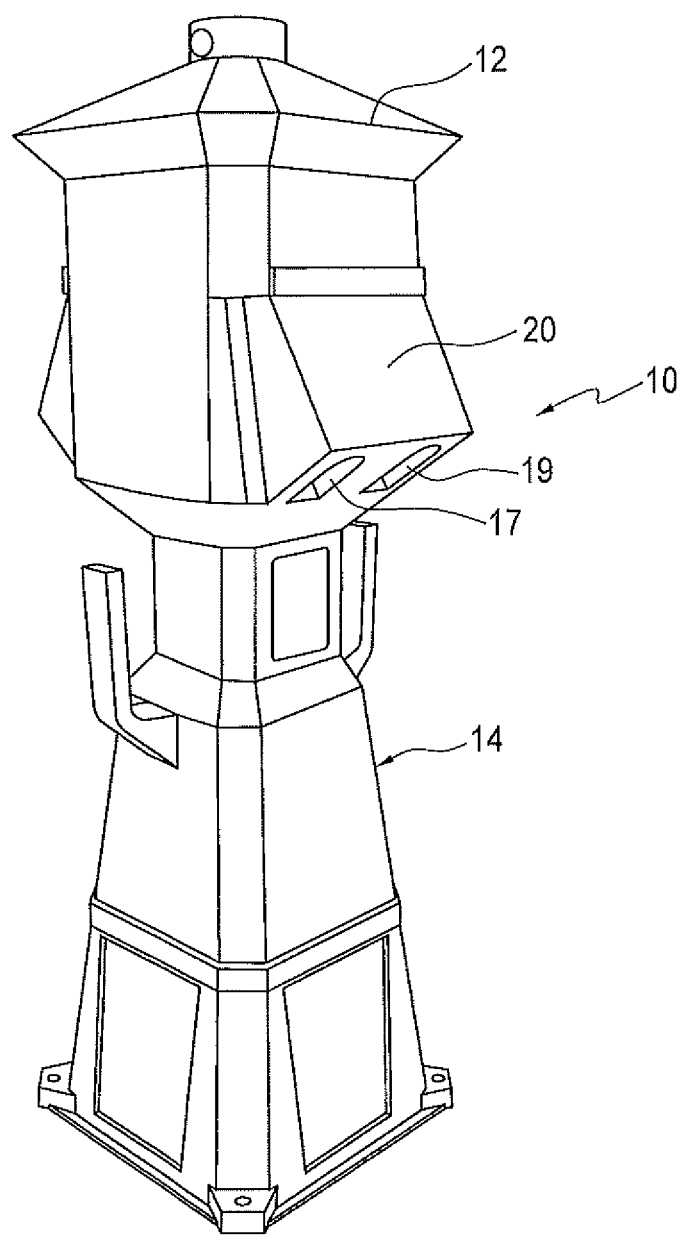
FIG. 1 is a perspective view of a typical dockside power pedestal.

FIG. 1 shows an example of a power pedestal, a well known article which is positioned dockside and provides electrical power to boats. The pedestal 10 receives power from a conventional land-based supply.

Figure 2:
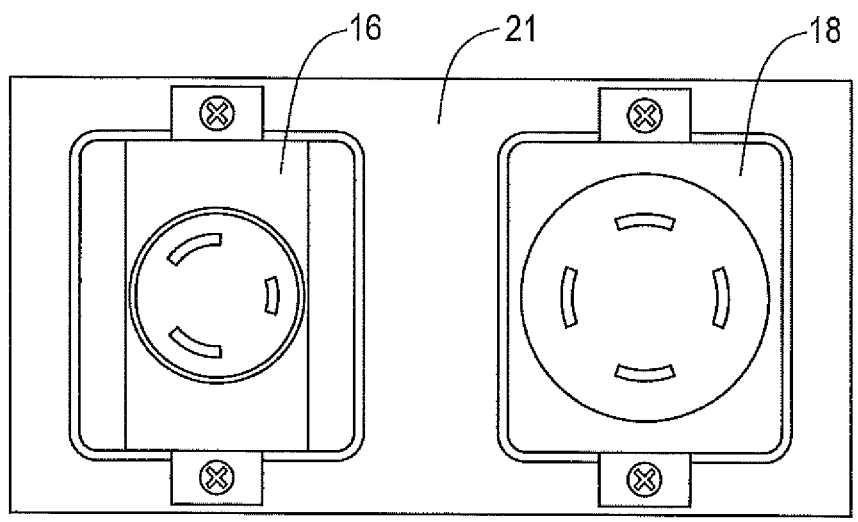
FIG. 2 is perspective view showing prior art electrical receptacles present in a power pedestal both with 30 amp and 50 amp service.
Figure 3:
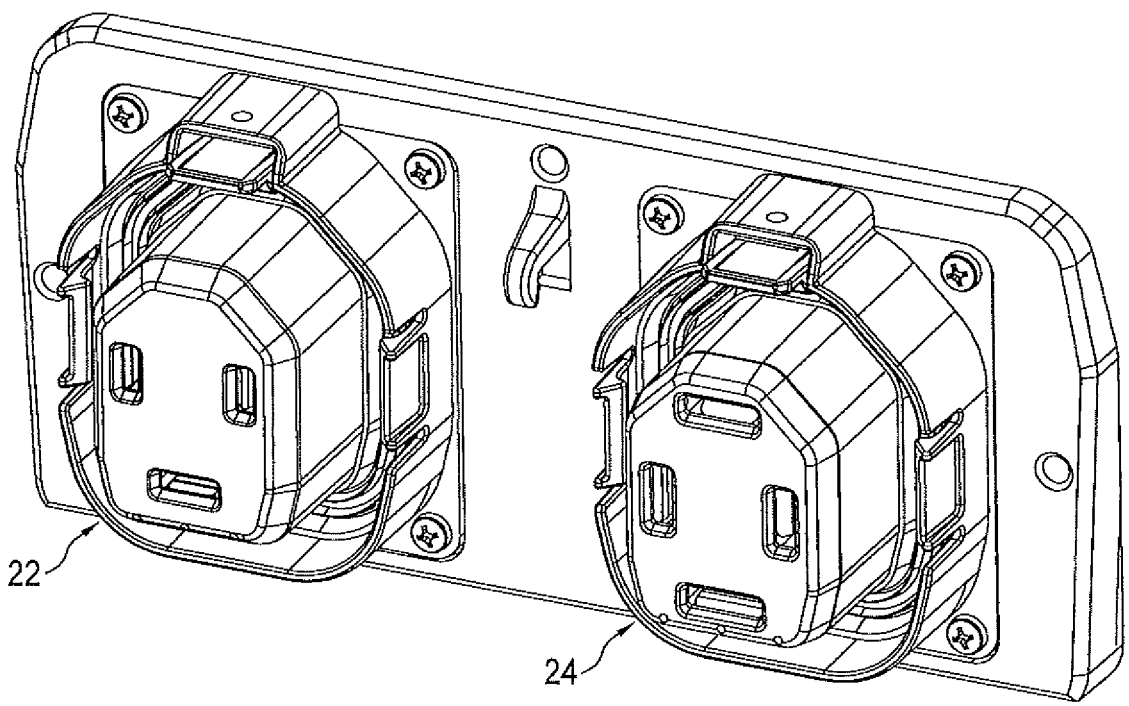
FIG. 3 is a perspective view showing 30 amp and 50 amp dockside receptacle assemblies in accordance with the present invention.

The pedestal 10 can include a number of specific features, including a light 12, a housing 14 and other features, such as water connections and phone or cable TV connections (not shown). Often, the pedestal will include 30 amp and 50 amp power receptacles 16 and 18 (FIG. 2) which are typically, but not always, covered by a lid 20. The power lines extend down at an angle through openings 17 and 19. In some cases, the receptacles are open to the weather. As previously indicated, even with a lid, the power receptacles are vulnerable to weather, which leads to corrosion in the electrical connections within the receptacle. Corrosion typically leads to failure or poor connectability and reliability, and in some cases may result in fire, which damages the receptacle and quite possibly the boat dock.

Figure 4A:
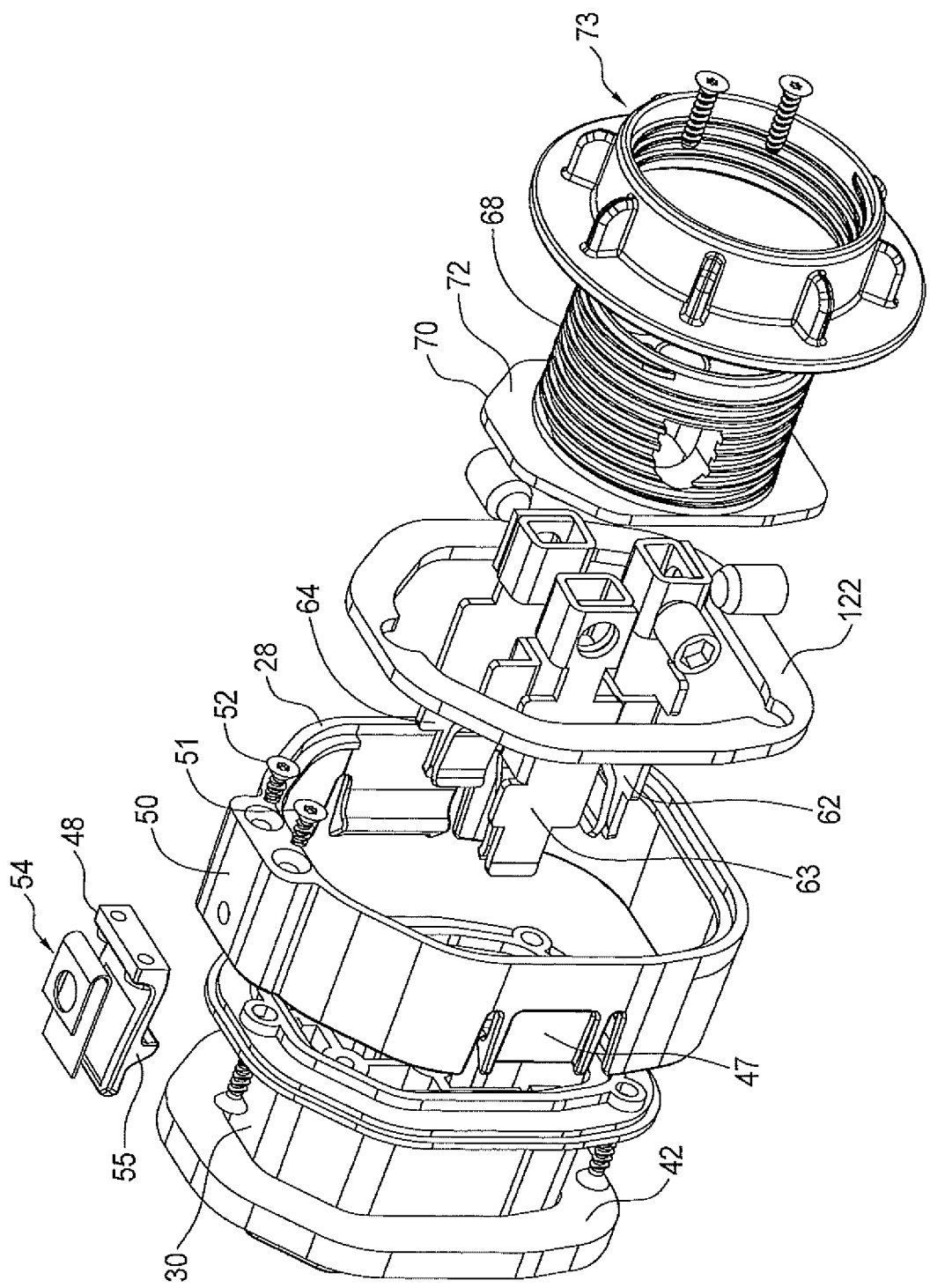
FIG. 4A is an exploded view of the power receptacle of the present invention from a rear perspective.
Figure 4B:
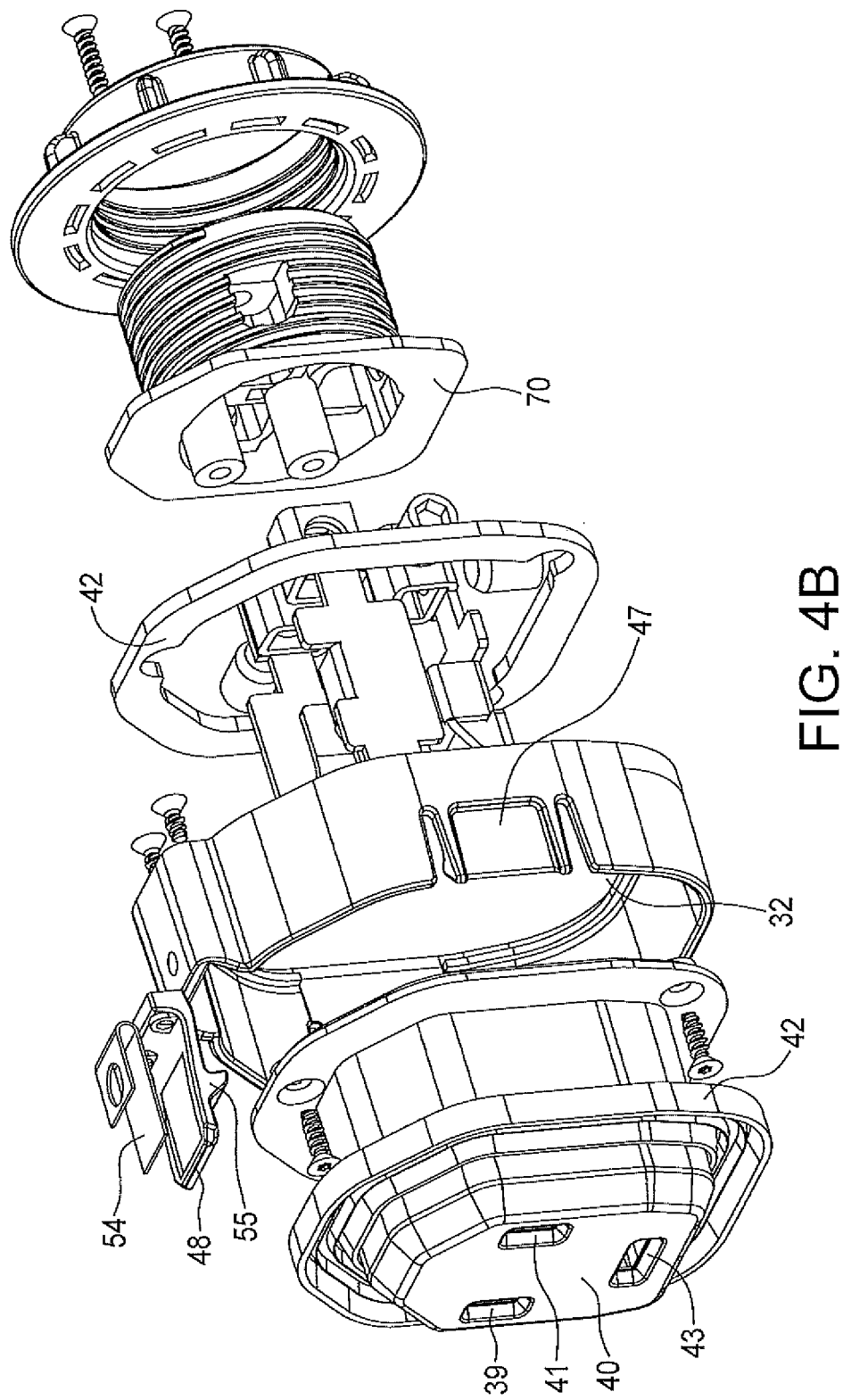
FIG. 4B is an exploded view of the power receptacle of the present invention from a forward perspective.

Referring now to FIGS. 4A and 4B, FIG. 4A shows an exploded view of a retrofit receptacle assembly 27 from the rear for a 30 amp receptacle, while FIG. 4B shows a front/forward view of the retrofit receptacle assembly. The 50 amp retrofit receptacle assembly is similar. The receptacle assembly 27 includes a housing member 28 which includes a generally octagonal shaped outer surface approximately 2.5 inches from side-to-side and approximately ⅞ inch from back to front. Housing member 28 surrounds an inner portion 30 having a non-symmetrical outline, matching a non-symmetrical outline of an inner surface 32 of the housing member, with a space of approximately ⅜ inch therebetween.

Figure 4C:
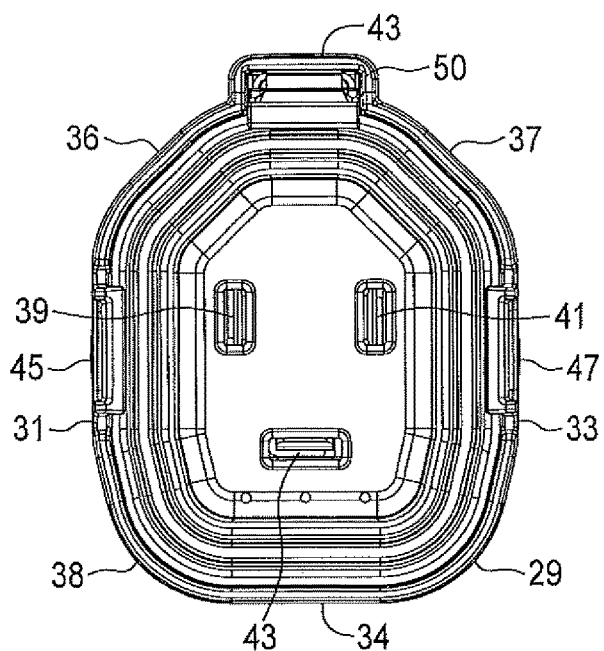
FIG. 4C is front elevational view of the power receptacle.
Figure 4F:
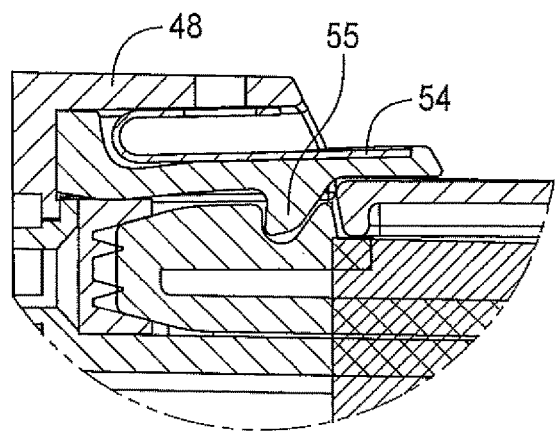
FIG. 4F is a close-up view of a portion 53 of FIG. 4E.
Figure 4D:
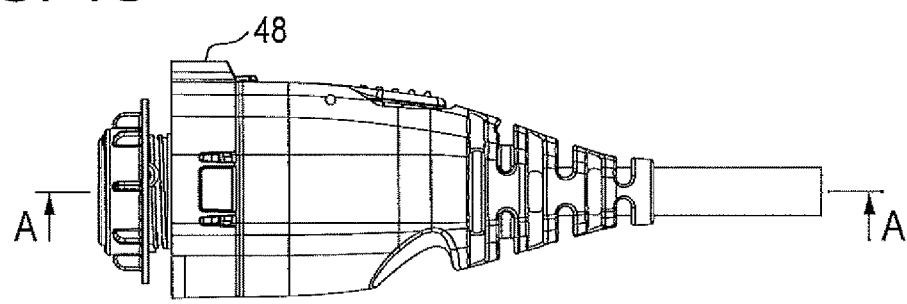
FIG. 4D is a side elevational view of the power receptacle with a male connector attached thereto.
Figure 4E:
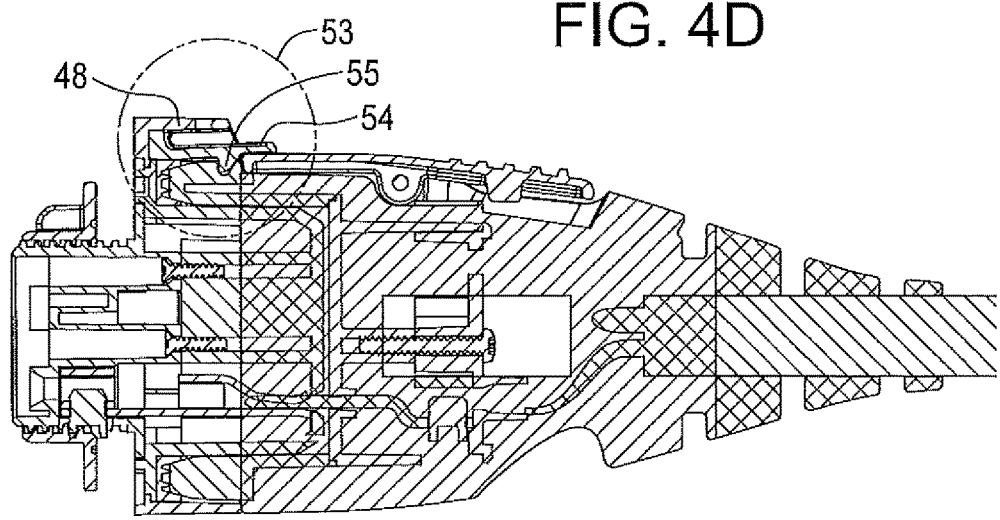
FIG. 4E is a cross-sectional view along lines A-A of FIG. 4D.

In the embodiment shown, referring to FIG. 4C, the non-symmetrical outline includes two opposing parallel side surfaces 31, 33, a flat bottom surface 34 joining the two side surfaces, two upper angled surfaces 36 and 37 and two lower angled/curved surfaces 38 and 39. The non-symmetrical configuration, however, can be varied. The inner portion 30 extends forwardly of the forward edge of the housing member 28 approximately ¾ inch. The inner portion 30 includes a front flat surface 40. Located in the front surface 40 are three openings, 39, 41 and 43 which are adapted to receive corresponding male electrical prong connection members therethrough. Positioned between inner portion 30 and housing member 28 is a seal 42. Seal 42 can be composed of rubber or other material, to seal the forward end of a male connector 49 (Figure 5B) against the seal between housing member 28 and the inner portion 30 of receptacle assembly 27. Housing member 28 includes an upper locking assembly 43 and two side locking assemblies 45 and 47. The upper locking assembly 43 includes an upper spring-loaded locking element 48 which is secured in a cavity 50 in housing 50a by two screws 51 and 52. Between upper locking element 48 and the upper portion of the cavity 50 is a spring element 54, which tends to hold the upper locking element 48 in a down position. The upper locking element 48 includes a protrusion 55 which fits into a groove in male connector 49 as discussed below.

Figure 5A:
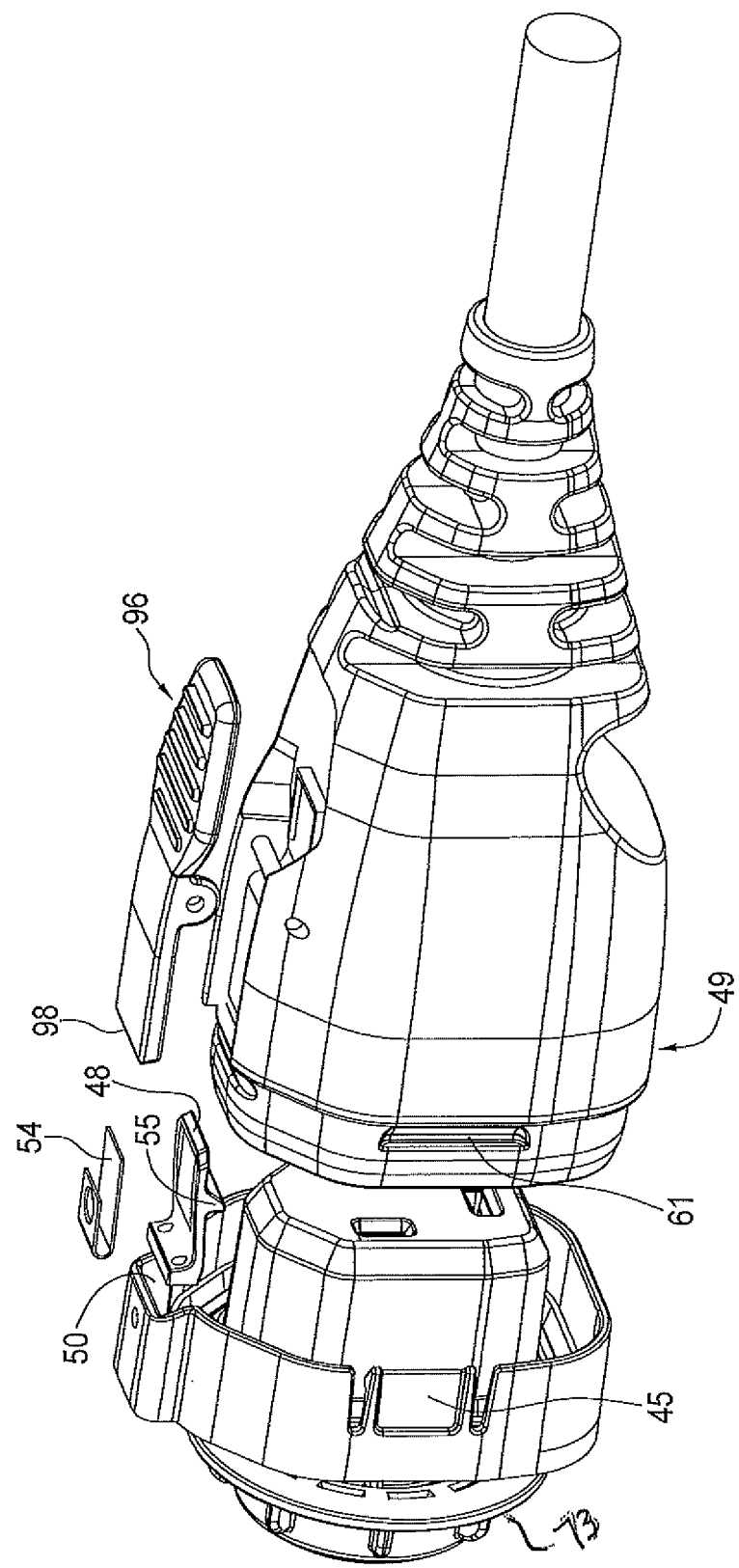
FIG. 5A is a perspective view showing a receptacle assembly and a mating male connector disassembled.

Housing member 28 also includes two side locking elements 45 and 47 which are flexibly attached at their rear edges to the housing member. The locking elements 45 and 47 fit into mating grooves/openings on the male connector 49. FIGS. 4B and 5A show the side locking elements. The side locking elements, respectively, are configured to fit with a frictional fit in groove 61 on one side and an opposing similar groove on the other side of the male connector 49. The frictional fit is sufficient to hold the male connector 49 in place in the receptacle assembly 27 but permits the male connector to be pulled out by hand force from receptacle assembly 27. The combination of the spring loaded upper locking element and the two side frictional fit locking elements 45 and 47 hold the male connector 49 securely in place relative to the receptacle assembly 27.

The housing member 28 and inner portion 30 are in the embodiment shown made of heavy duty plastic. As indicated above, the inner portion 30 extends forwardly beyond the forward edge of the housing member, and as discussed above, the male connector 49 can be fitted within the opening between the inner portion 30 and the housing member 28. As shown in FIG. 4A, electrical wires from the power pedestal are connected to three wire connectors 62, 63 and 64 on the inner portion. A threaded portion 68 has a front plate 70 which fits into a cavity at the rear of the housing member 28. The threaded portion 68 fits back through an opening in the mounting plate of the power pedestal, with the rear surface 72 of front plate 70 coming into contact with the mounting plate. A cap 74 is threaded onto the threaded portion 68 holding the power receptacle assembly in place to the mounting plate in the pedestal.

Figure 5B:
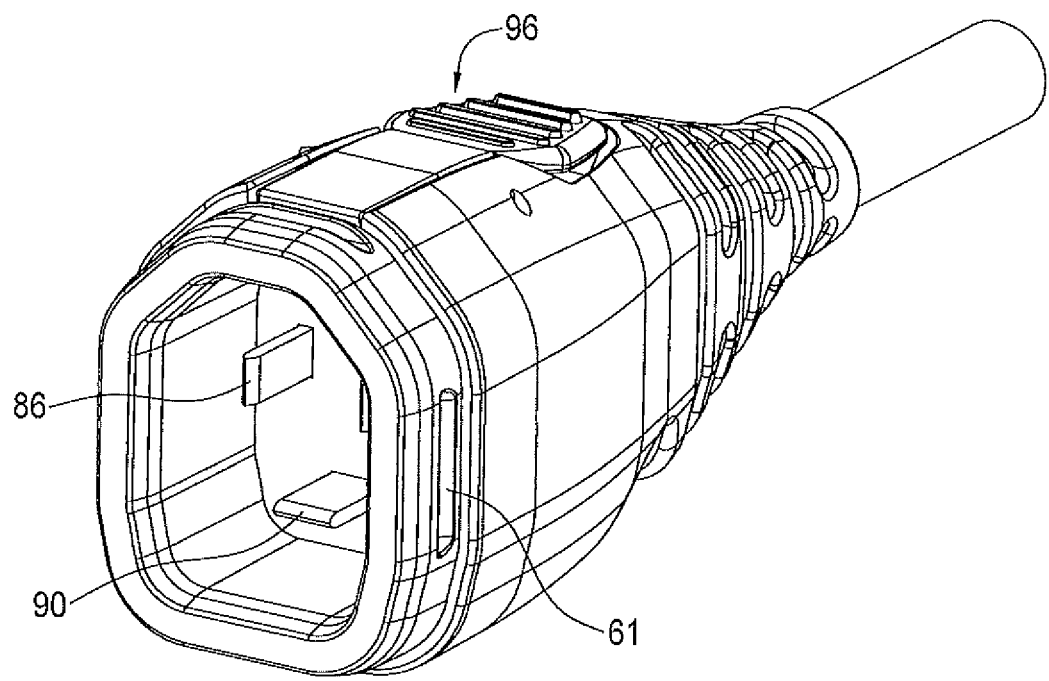
FIG. 5B is a perspective view showing of the male connector of FIG. 5A.
Figure 5C:
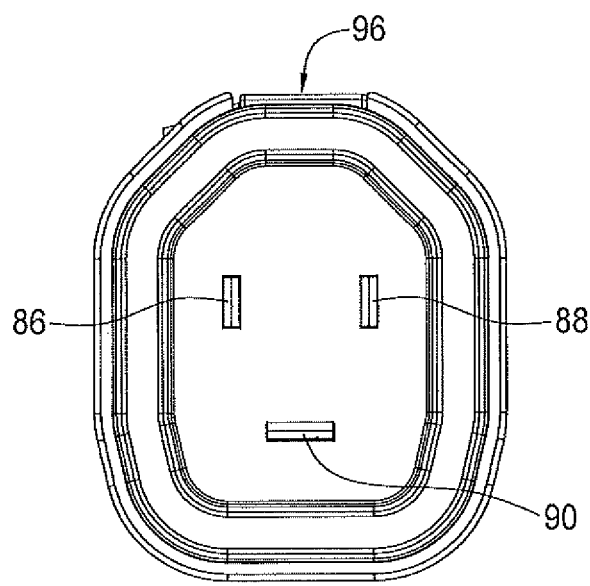
FIG. 5C is a front elevational view showing the male connector of FIGS. 5A and 5B.

FIGS. 5A-5C show an assembled receptacle assembly and a mating male connector assembly as shown in previous figures, with a male end of the connector adapted to mate with the non-symmetrical opening of the receptacle assembly. FIGS. 5A and 5C show a male connector with three extending prongs 86, 88 and 90 which are configured to fit tightly into the openings in the receptacle assembly, providing electrical connection between the receptacle assembly and the male connector assembly. FIG. 5C shows a front end view of the male connector. FIGS. 5A and 5B show a lever 96 on top of the male connector. The forward end 98 of the lever 96 fits under the forward edge of the upper locking element 48 when the male connector is positioned in the receptacle assembly. When the lever 96 is pushed downwardly, the upper locking member 48 is moved upwardly against the resistance of spring 54, releasing the upper locking member. As indicated above, the flexible side locking elements 45 and 47 on the housing member fit into receiving side grooves on the male connector. The contact is tight enough to prevent accidental disconnect, but can be pulled apart without great effort. The above arrangement provides a water-tight seal against the elements between the receptacle assembly and the male connector and a reliably tight fit between the male connector and the receptacle assembly. When the power receptacle assembly is not in use, the lid 20 on the power pedestal is simply moved down over the receptacle assembly.

Figure 5D:
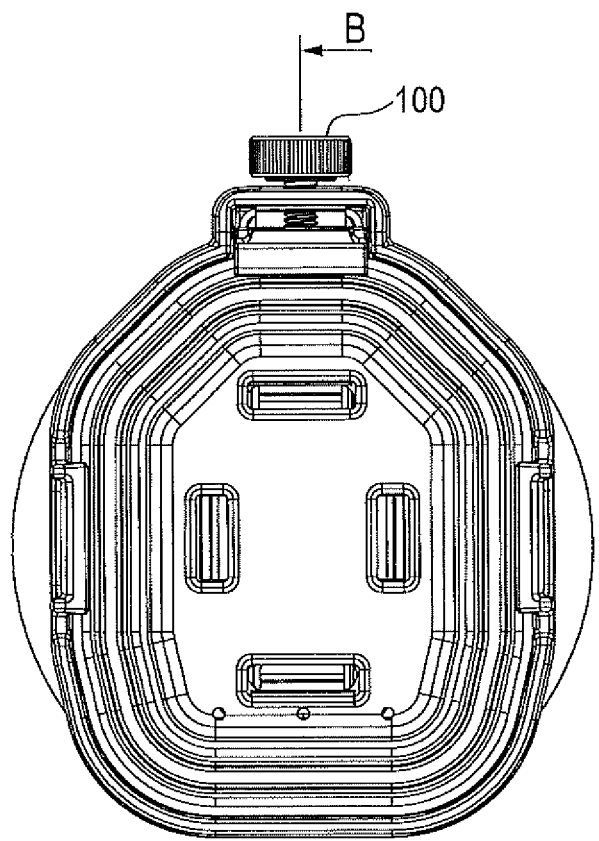
FIG. 5D is a front elevational view showing the receptacle assembly with and added thumbscrew element.
Figure 5E:
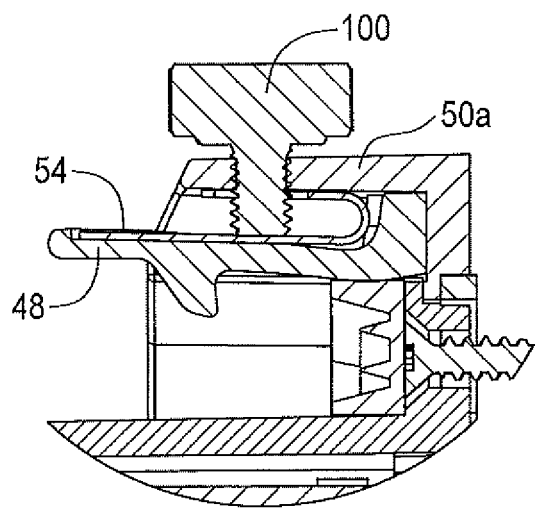
FIG. 5E is a cross-sectional of a portion of FIG. 5D showing the thumbscrew arrangement.

FIGS. 5D and 5E illustrate the use of a thumb screw 100 which is threaded through housing 50a and the upper part of spring 54. When the thumb screw 100 is in its down most position, the lever 96 on the male connector cannot release the upper locking element 48, thereby maintaining the upper locking element securely in place. This is an additional safety feature preventing unintended disconnect of the male connector from the receptacle assembly.

Figure 6A:
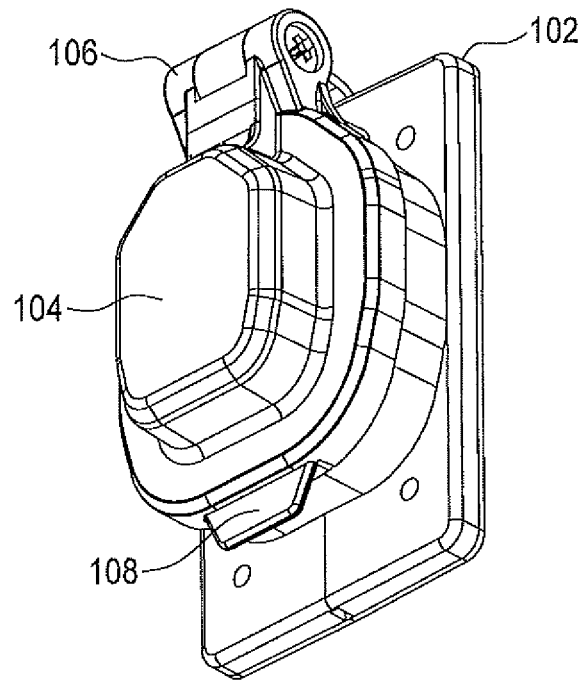
FIG. 6A is a perspective view of a weather resistant connector for a pedestal.
Figure 6B:
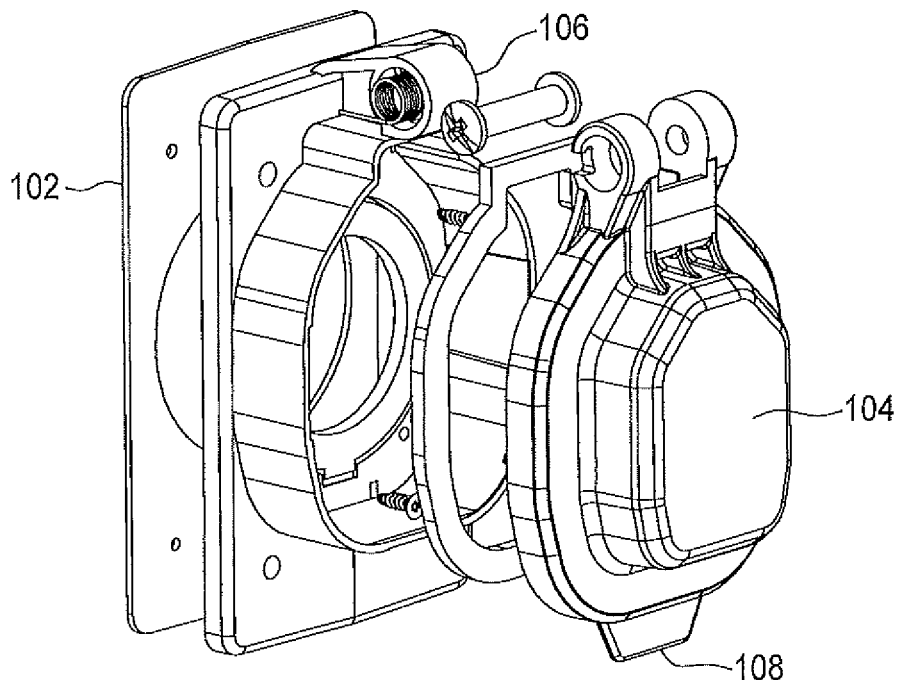
FIG. 6B is an exploded view of the connector of FIG. 6A.
Figure 6C:
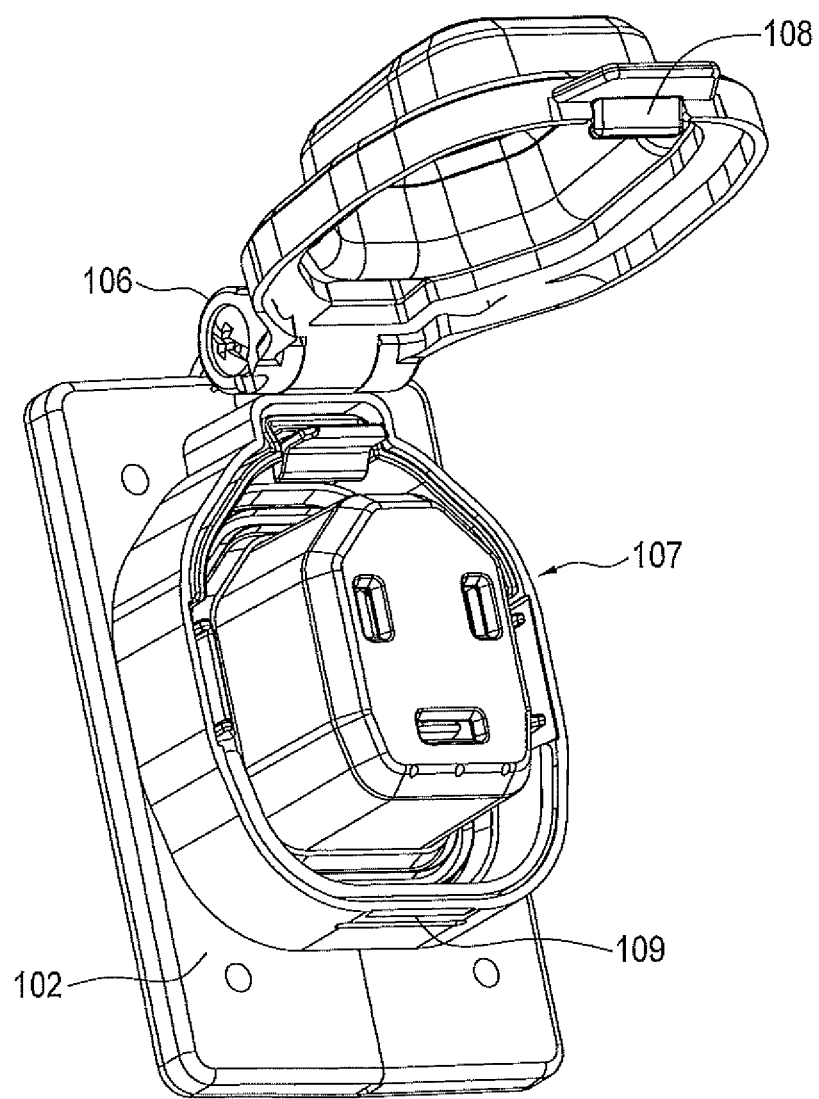
FIG. 6C is perspective view of the weather resistant connector with the power receptacle installed.
Figure 6D:
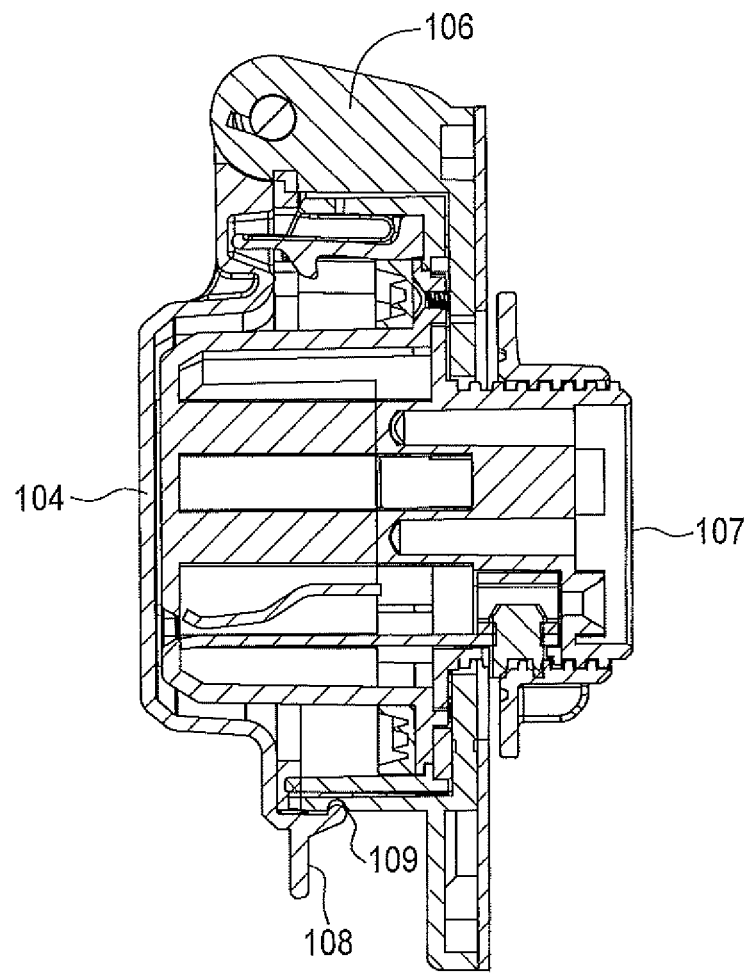
FIG. 6D is a cross-sectional view of FIG. 6C showing the weather cover in a closed position.
Figure 6E:
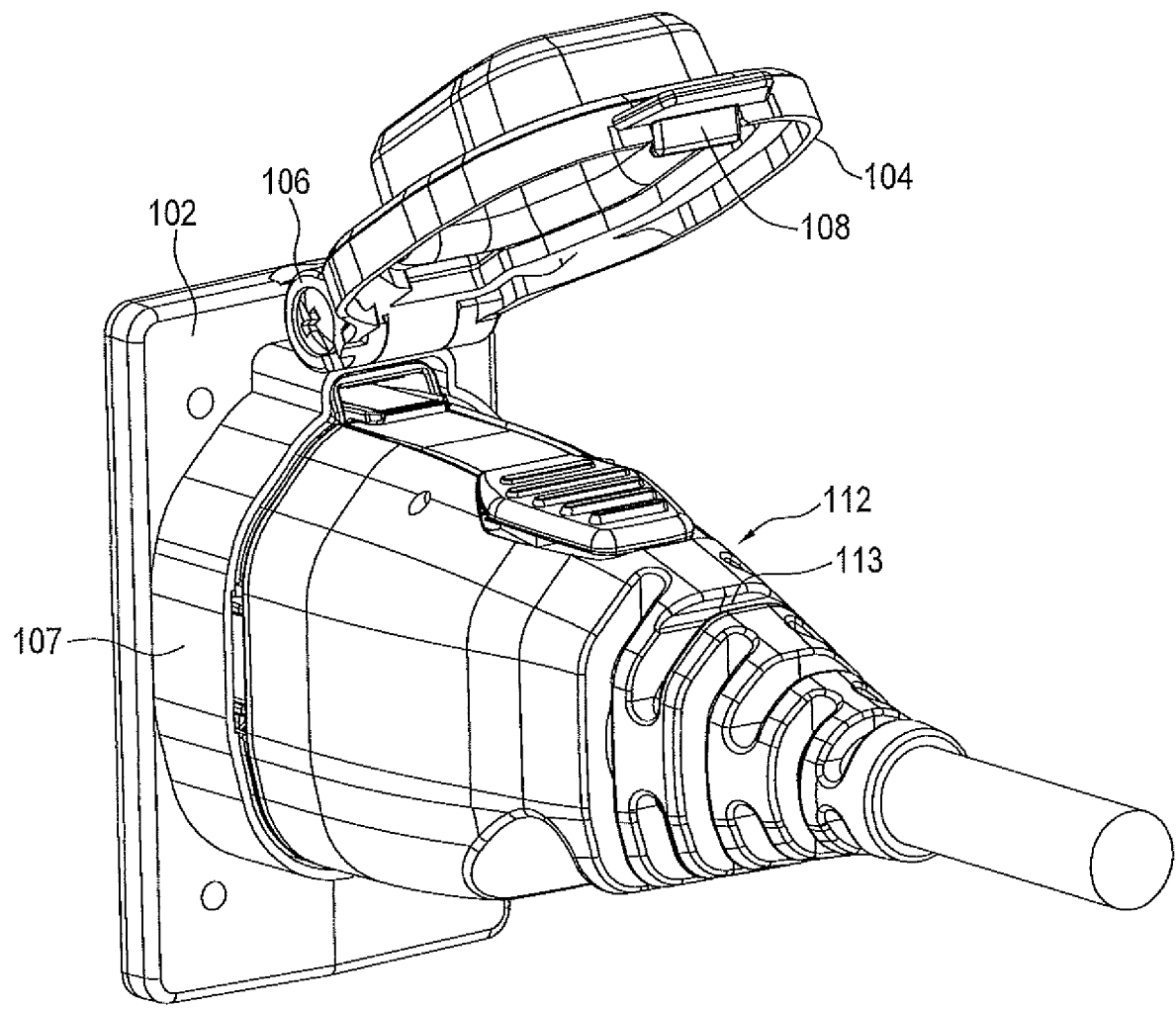
FIG. 6E is a perspective view showing a male connector in place with the power receptacle with the weather resistant connector in an open position.
Figure 6F:
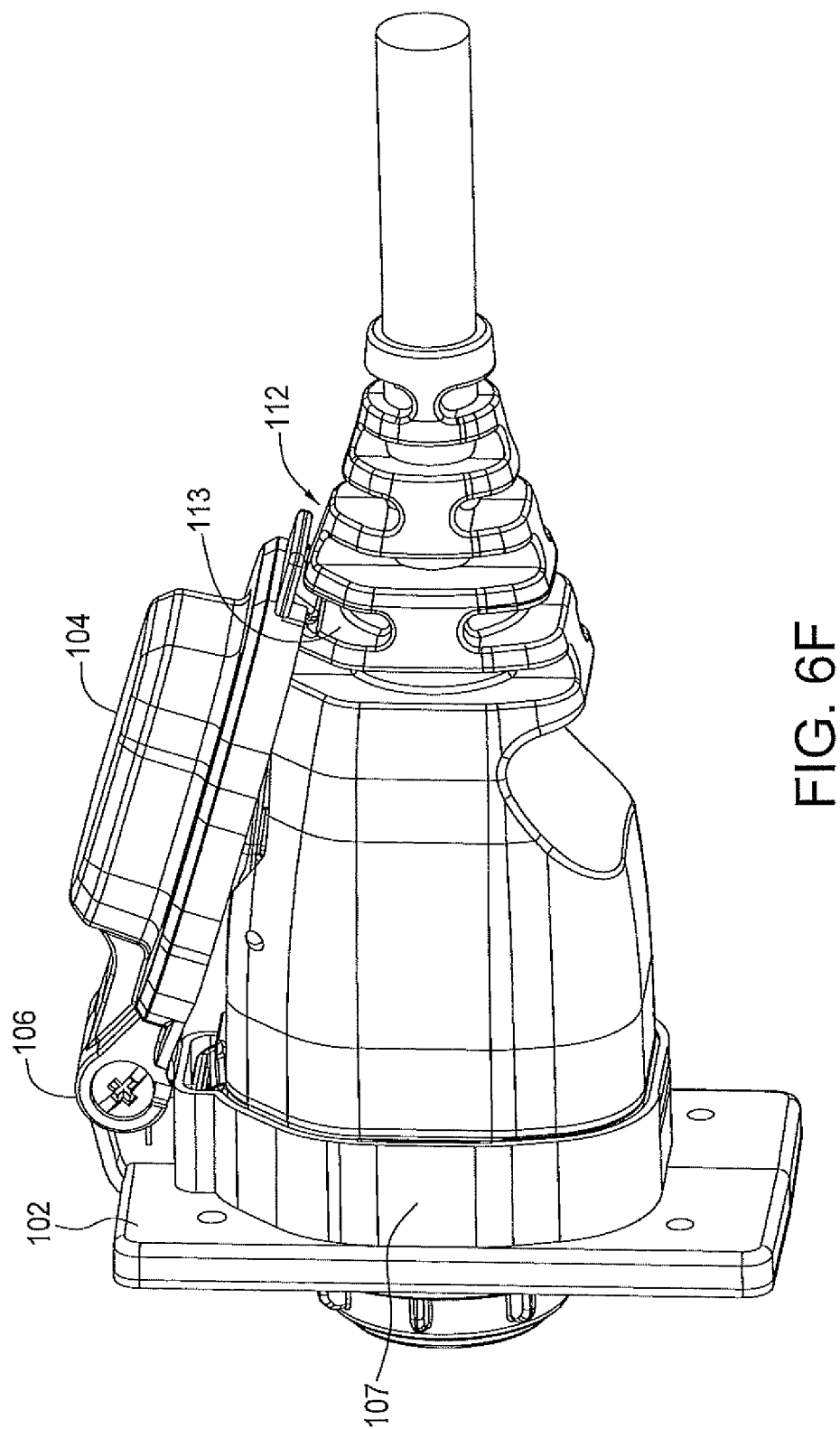
FIG. 6F is a perspective showing the weather resistant cover in a closed position in place on the male connector.
Figure 6G:
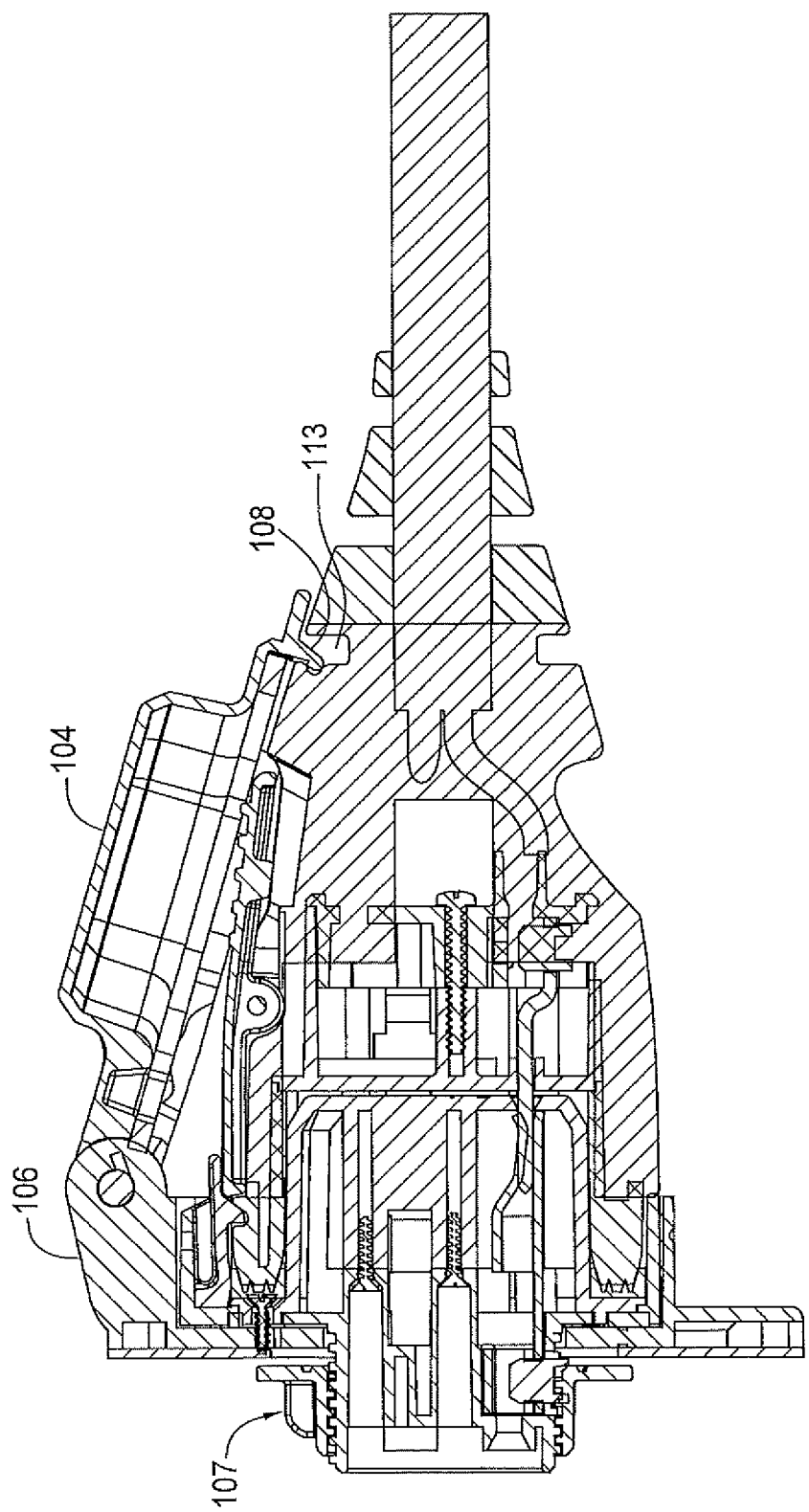
FIG. 6G is a longitudinal cross-sectional view of FIG. 6F.

FIGS. 6A through 6G show a water resistant weather proof cover for the power receptacle assembly. The water resistant cover includes a back plate 102 and a hinged cover element 104. The back plate 102 can be attached to a conventional or other pedestal at the dock. The cover 104 is pivotally connected to the upper exterior surface of the back plate by a pivot assembly 106. The cover fits over the housing member of the power receptacle assembly 107 providing reliable protection against the elements. The cover includes a small tab 108 at a lower end thereof which fits into a corresponding opening 109 at the lower edge of the receptacle assembly when the cover is in a closed position. FIG. 6D shows this connection most clearly. When a connection between the receptacle assembly and the male connector is desired, the cover 104 is pulled away and swiveled upwardly about the pivot assembly 106, exposing the inner portion of the receptacle assembly for connection. FIG. 6E shows a male connector 112 connected to power receptacle assembly 107 with cover 104 in an open position. FIG. 6F shows cover 104 in a closed position, in which tab 108 now fits into a locking groove 113 in the surface of the male connector 112. This is shown most clearly in FIG. 6G. Cover 104 locked into groove 113 in the male connector, helps to prevent unintended disconnect.

FIG. 7 shows a typical connector arrangement involving a pedestal outlet assembly with a power receptacle assembly 118 and a cover assembly 119 and a boat inlet assembly 117 with a cover assembly 121 and an intermediate connector assembly 120. The pedestal assembly receptacle 118 has a female configuration while the boat inlet assembly 117 has a male configuration. The length of the connector assembly 120 is variable. The direction of current flow is from the pedestal outlet assembly to the boat inlet assembly.

While the embodiment of FIGS. 4A-4B show a weather seal 42 between the housing member and the inner portion which the forward edge of the male connector contacts, other seal arrangements can be used. In the one example shown in FIGS. 4A-4B, weather seal 122 can be positioned behind the rear surface of the inner portion and the mounting plate for the receptacle assembly. Other sealing arrangements can be used as well.

Figure 8:
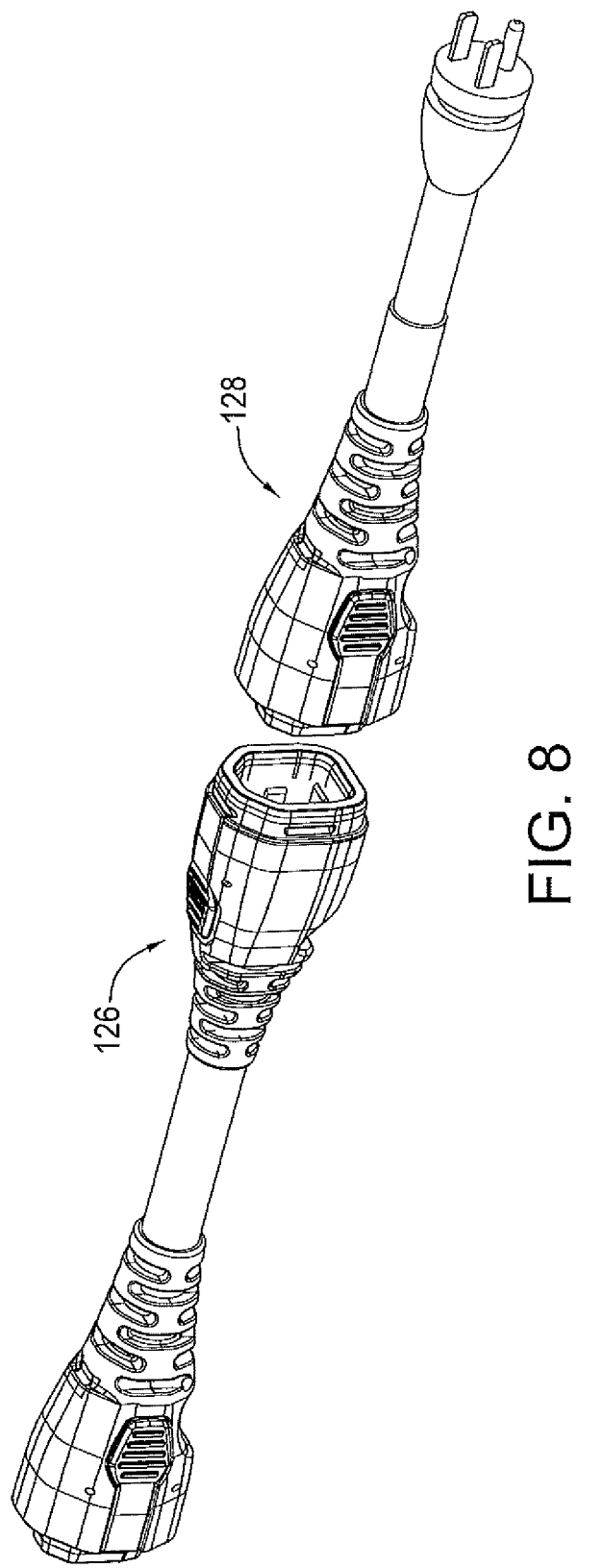
FIG. 8 is a schematic view of an electrical connector assembly of FIG. 7 with a matching connector arrangement from a boat.

FIG. 8 shows an arrangement with a connector 126 with an adapter arrangement 128 for an older style connection to a boat or RV such as a twist connector or other type of connection.

Figure 9:
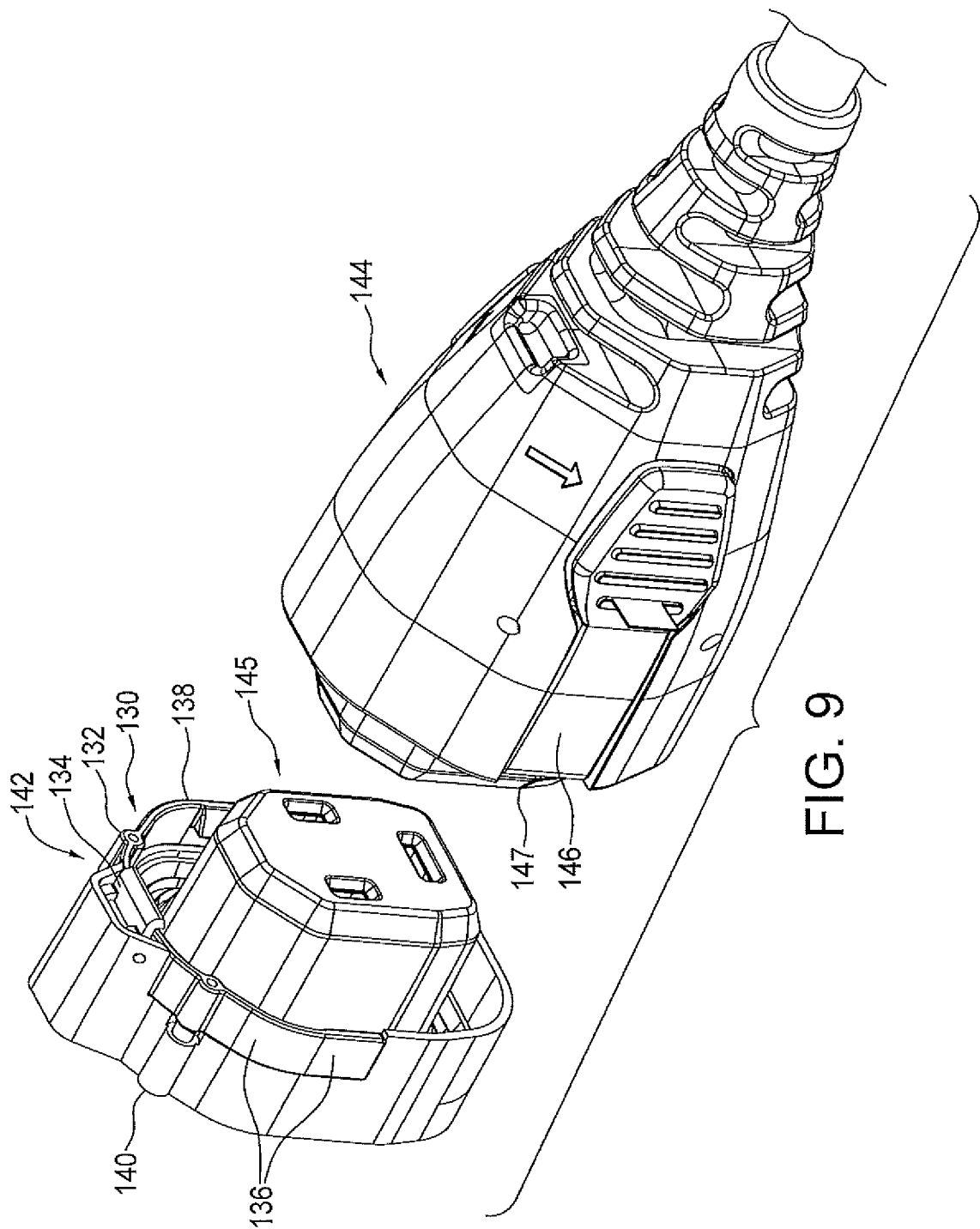
FIG. 9 is a schematic view of an alternative locking arrangement for a power receptacle assembly and a male connector.

FIG. 9 shows an alternative for locking a male connector 144 to a power receptacle assembly 145. At a forward edge 130 of housing member 132 is an actuator member 134. Extending along the outer edges of the housing member are two side locks 136 and 138, mounted to hinge elements 140 and 142, respectively. The male connector 144 includes thumb lever 146 on the top of connector 144. When the male connector engages the power receptacle assembly, the side locks engage openings in the outer surface on the male connector 144, locking the male connector to the receptacle assembly 145. The forward end 147 of lever 146 fits under the actuator 134. When the male connector is to be released, thumb lever 146 on the male connector is pushed down. The lever 146 acts on the actuator 134 so that both side locks swing out, permitting disengagement of the male connector from the receptacle. It should be understood that other mechanisms for securely engaging the male connector to the receptacle are possible.

Accordingly, a power receptacle assembly has been disclosed for a dockside power pedestal. The receptacle assembly includes a female receptacle to which a male connector can be mated, the connection in one embodiment including an upper locking element and two side locking elements on the receptacle and receiving grooves/openings in the male connector, providing a secure connection between the male connector and the female receptacle Although a preferred embodiment of the invention has been disclosed for purposes of illustration, it should be understood that various changes, modifications and substitutions may be incorporated in the embodiment without departing from the spirit of the invention, which is defined by the claims which follow.

What is claimed is:

1. A power receptacle assembly for use on a dockside post, comprising:
    a power receptacle assembly configured to be securable to a dockside post, the power receptacle assembly including a power receptacle having an outer housing member and an inner portion which extends from the housing member forwardly beyond a forward edge of the outer housing member, arranged to define an opening between the outer housing member and the inner portion, the inner portion having a forward surface with female openings to receive therethrough male electrical prongs from a separate male connector assembly connecting to electrical connections positioned within the inner portion, wherein the male connector is inserted into the power receptacle, thereby providing electrical connection between the power receptacle and the male connector assembly, wherein a forward portion of the male connector assembly fits within the opening between the outer housing member and the inner portion, wherein the male connector assembly is connectable to a power supply on a boat present at dockside;
    wherein the electrical connections positioned within the inner portion of the power receptacle receive electrical power from a power source present on the dockside post, wherein the power receptacle assembly includes a mounting member to which the power receptacle is secured, wherein the power receptacle assembly is securable to the dockside post, such that electrical power from the power source on the dockside post is provided to the power receptacle in the power receptacle assembly; and
    a weather resistant cover assembly for the power receptacle, including a cover member pivotally connected to the power receptacle, wherein the cover member in a closed position covers a front portion of the power receptacle for weather resistance when the male connector assembly is not inserted into the power receptacle, the cover member having a tab at a lower end thereof for locking the cover member in its closed position to the power receptacle, and wherein the cover member in an open position is latchable to a mating portion of an inserted male connector assembly, thereby providing securement between the power receptacle and the inserted male connector assembly.

2. The power receptacle assembly of claim 1, including a weather seal for the cover member when the cover member is in the closed position.

3. The power receptacle assembly of claim 1, wherein the inner portion of the power receptacle includes a threaded distal end which extends rearwardly of the outer housing member and a threaded cap which, when threaded onto the threaded distal end of the inner portion, secures the power receptacle to the mounting member.

* * * * *